April 9, 1929.  M. W. SEYMOUR  1,708,370
SYSTEM FOR COLOR PHOTOGRAPHY
Filed Aug. 22, 1927  3 Sheets-Sheet 1
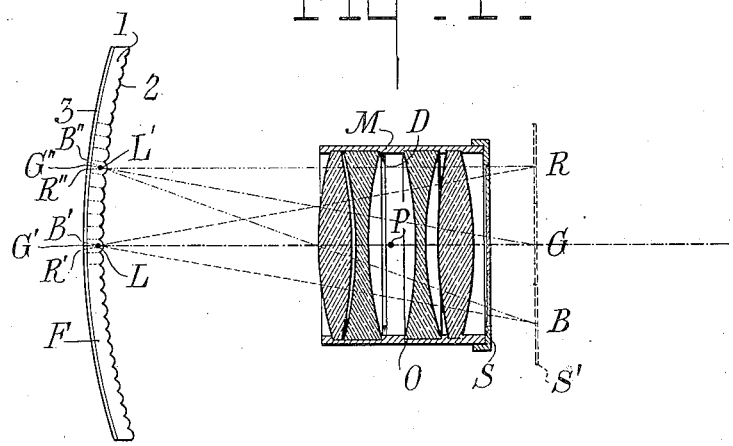
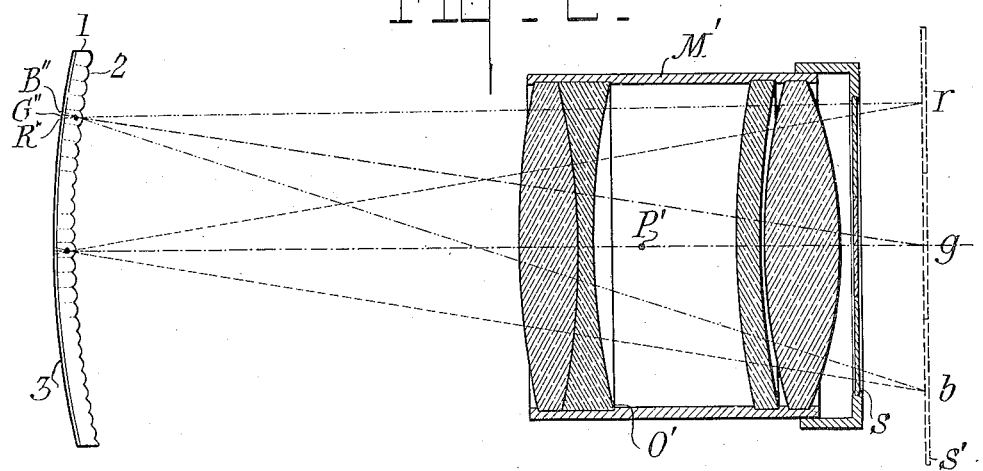
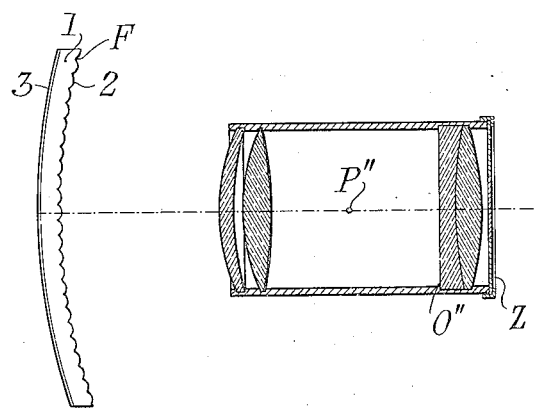
INVENTOR,
Merrill W. Seymour,
BY R. L. Stinchfield
M. M. Perrins
ATTORNEYS.

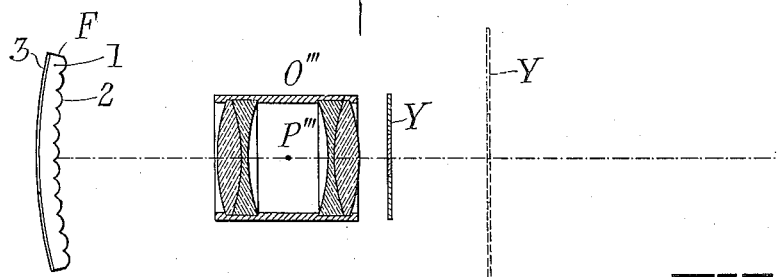
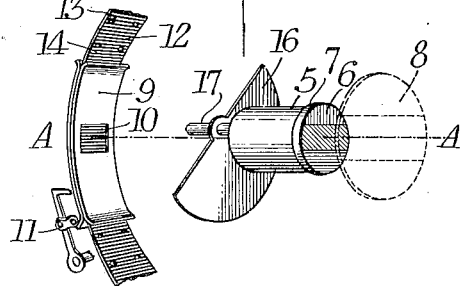
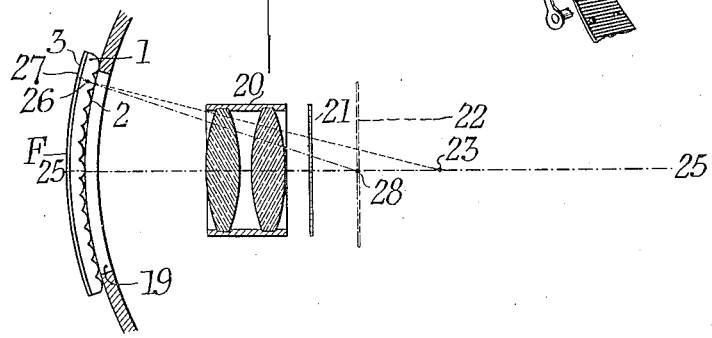
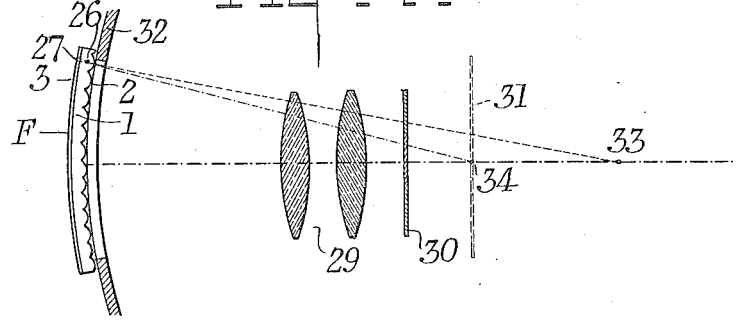

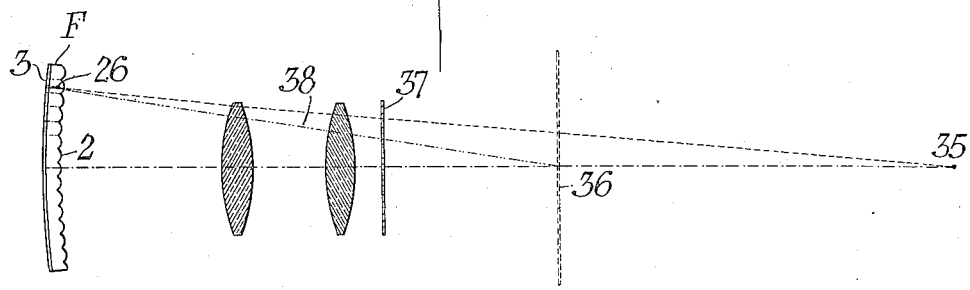
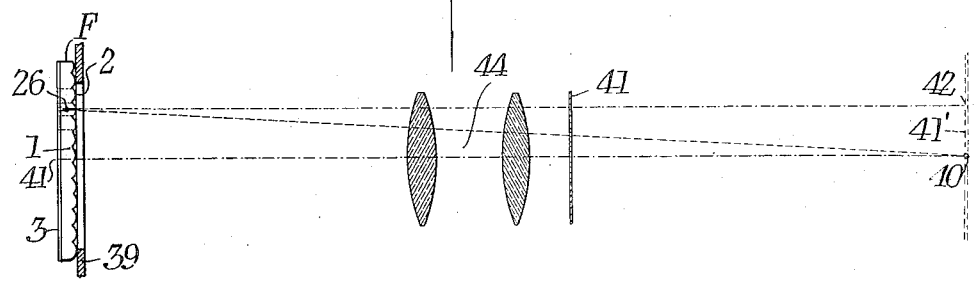
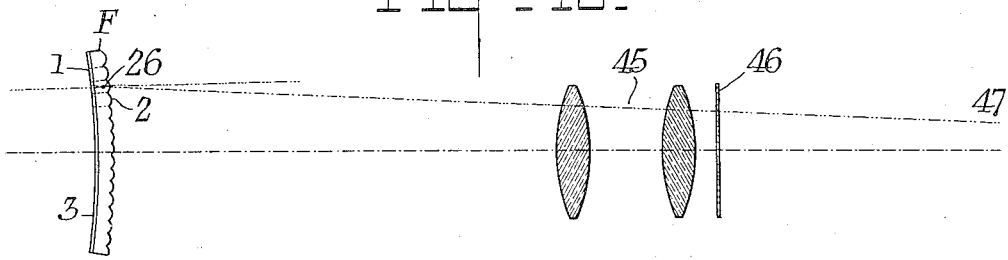

Patented Apr. 9, 1929.

1,708,370

UNITED STATES PATENT OFFICE.

MERRILL W. SEYMOUR, OF ROCHESTER, NEW YORK, ASSIGNOR TO EASTMAN KODAK COMPANY, OF ROCHESTER, NEW YORK, A CORPORATION OF NEW YORK.

SYSTEM FOR COLOR PHOTOGRAPHY.

Application filed August 22, 1927. Serial No. 214,542.

This invention relates to a color process and particularly to an improvement applicable to a process of the type disclosed in the patent to Berthon, 992,151, granted May 16, 1911, involving the use of a support with microscopic lenses on one surface and a sensitive emulsion on the other surface.

One of the problems in this process is the taking and projecting of the images by objectives of different focal lengths. As is pointed out in the French patent to Societe Du Film K. D. B. 573,508 delivered March 12, 1924, the virtual images of the screen must appear the same from any point of the photographic plate.

I have found that this end may be attained by using in the different taking and projection systems gates differently curved or bowed. The relation between the curvatures in the two systems should be such that the minute images of the screen thrown by the individual microscopic lenses on the image layer will coincide in the two systems. While this expedient is theoretically possible whatever the type or form of microscopic image forming element, it is most practical when these are of the lineal or convex ridge type. In this case the gates are curved or bowed cylindrically, the axis of curvature being parallel to the microscopic elements and to the bands of the color screen and, preferably, intersecting the optical axis of the system at the virtual image of the screen.

As will be more fully explained hereafter, this has the double advantage of rendering the system independent of the focal length of the objective and of centering each minute screen image behind and in line with the minute lens forming it. Other advantages and a more complete explanation of my invention will appear in the following description wherein the same reference characters are used to designate the same elements throughout and in which reference will be made to the accompanying drawings in which:

Fig. 1 is a diagram of an optical system embodying my invention;

Fig. 2 is a diagram of system complementary to Fig. 1, for use in projecting images made by the first system;

Figs. 3 and 4 are diagrams of other systems complementary to Fig. 1;

Fig. 5 is a perspective diagrammatic view of a system embodying my invention;

Fig. 6 is a diagram of a modified system;

Fig. 7 is a diagram of a system complementary to Fig. 6;

Fig. 8 is a diagram of a still further modified system;

Fig. 9 is a system complementary to Fig. 8;

Fig. 10 is still another modified system.

In the system shown in Fig. 1, O is a camera objective in a mount M having the diaphragm D behind which is a film F comprising a support 1, having on its front surface a series of minute lenses 2 and on its rear surface a photographic layer 3. In front of the objective and very close thereto is a polychromatic screen S, the virtual image of which occupies the positions S'. The film F is flexible and is bent or bowed, its center of curvature being at G on the optical axis at the center of the virtual image S'. The images of the filter will obviously then be formed behind any individual lens 2 concentric with such lens, since a line from G through the center of such lens is on its optical axis, instead, as is the case with flat films, of being inclined thereto and producing an image not directly behind the individual lens, except at the axis. There are shown rays from the central point R, G, or B, of each color screen band image to an axial lens L and a lens L' off the axis. It is obvious that the corresponding image points R', G', and B' of the axial lens, and R'', G'', and B'' of the lens L' are symmetrically behind the respective lenses, the bounds of the lens are as being indicated in dotted lines.

The projection system shown in Fig. 2 comprises an objective O' of any desired focal length in a mount M'. It is here shown as larger than that of the camera, but having the same relative aperture. Mounted closely in front of the objective is a screen $s$ similar to S, its virtual image being at $s'$. The same film F which was exposed in the system of Fig. 1 having been exposed and a positive image developed therein, is situated behind the objective and is bent or bowed, its center of curvature being at $g$ on the optical axis of the objective and the center of the virtual image. When illuminated from the rear, the image behind any particular minute lens, being centered on the optical axis of such lens, will be projected into the objective by the little lens symmetrically of a line to G, typical rays being $R''r$, $G''g$, and $B''b$, so that the images fall upon the appropriate parts of the screen and give a correct color rendering of the several parts of the subject.

The projection objective may be of the same equivalent focal length as the taking objective but for structural reasons it may be necessary or desirable to locate the screen at a different point than in the camera. This will result in the virtual image occupying a different plane and the curvature of the gate being different. For instance, there is shown in Fig. 3 a projection objective O″ of the same aperture and equivalent focal length as the camera objective of Fig. 2. The screen Z is situated farther from the optical center P″ than the screen S is from the optical center P. The virtual image Z′ is also farther away and the curvature of the film will have its center about the point X.

It may also happen that while the projection objective has a different focal length from the taking objective, it is possible to position the screen so that its virtual image will be at the same distance from the rear focal point. In Fig. 4 is shown an objective O‴ the optical center of which is at P‴ and having a screen Y the virtual image Y′ of which is distant from the rear focal point at which is the film F by the same distance as is the virtual image in the taking system Fig. 1. The objective, however, has a shorter focal length than the objective O and the curvature of the film is the same.

It is to be further noted that when the screen is placed at the front focal point of the objective, as in the preferred forms of my copending application Serial No. 214,540 filed August 22, 1927, the distance to the virtual image is infinite, the radius of curvature is infinite and both gates are flat. To that extent, the preferred form of that application is a special case of the invention herein covered.

While the above discussion is general, applicable to spherical, linear, and cylindrical types of microscopic elements and to spherically and cylindrically curved gates, this expedient is particularly applicable to motion picture film in which the ridges are transverse of the film. The gates may then be curved cylindrically being designed with special reference to the system with which they are to be equipped.

I have shown in Fig. 5 a diagrammatic showing of a preferred optical system embodying my invention. There is here shown a mount 5 for a suitable objective, a screen 6 having horizontal color bands being mounted in a cap 7 on said mount and the virtual image of the screen being indicated in dotted lines at 8. A curved gate 9 has an exposure window 10 past which is drawn, by a mechanism indicated conventionally at 11, a film 12 having perforations 13 and transverse convex ridges or partially cylindrical lens elements 14. The gate is cylindrically bowed, its center of curvature being a line intersecting the optical axis A—A at the position of the virtual image 8. A shutter 16 is shown as mounted for rotation on a shaft 17, it being understood that this is driven in timed relation to the pull down mechanism.

In practice, I have found that good color rendering is obtained if the curvature is less than the theoretical requirement. It is only necessary that the curvature of the two instruments be so related that the minute images on the film will be projected through the proper filter or screen elements. While either objective may have the greater focal length, it is customary for the projection objective to have it and this will be assumed. If the camera gate radius is greater than the distance to the corresponding virtual image, the projection gate radius of curvature should also be correspondingly greater than the distance to its virtual image. If the camera gate has a fairly long radius the projection gate may indeed be straight and if the camera gate be straight or even convex the projector gate would be still more convex.

In Fig. 6 is indicated a camera objective 20, with a filter 21, the virtual image of which is at 22. The gate 19 and the film F are curved with the center of curvature at 23 beyond the virtual image.

A line from 23 on the optical axis 25—25 of the camera system to the center 26 of any individual lens element 2 is the optical axis of such a system. A minute image of the screen 21 will however, have its center point 27 on an extension of the line through 26 from 28, the center of the virtual image on the optical axis 25—25. The minute images of the screen 21 as projected on the image layer 3 will be somewhat displaced from exact registration with the minute lens elements by which they are formed, except at the axis. A complementary projection system for use with the film exposed in Fig. 6 is shown in Fig. 7. It has an objective 29 and a screen 30, the virtual image of which is at 31. The gate 32 is curved with its center of curvature at 33 beyond 26 and at such a point that a line drawn from the axial point 34 through the optical center 26 of any of the minute lenses 2 will pass through the center 27 of the tiny photographic image of the original screen as produced by that element.

This is a relation that must exist between and therefore defines the relative curvatures in the gates of the two systems which are complementary in accordance with the principles of my invention. It is to be noted that this condition may be expressed geometrically by stating that the angle between lines drawn from the optical center of an individual minute lens to the position on the optical axis of the system of the virtual image of the screen and of the center of curvature of the gate must be the same in both camera and projector. In the preferred form this angle is zero, as it is in the preferred form of my copending application Serial No. 214,540, filed August 22, 1927. The angle 28—26—23 in Fig. 6, for instance, is equal to the angle 34—26—33 in Fig. 7. In practice a point on the gate guiding the film may be taken, as the angle there is substantially the same.

In Fig. 8 the film F in a camera has a center of curvature at 35 beyond the virtual image 36 of its screen 37, in front of objective 38, and the resultant image is projected through the system of Fig. 9 with the flat gate 39, the radius of which is, of course, infinite, and the curvature zero. The virtual image 41' of the screen 41, is at such a distance that the angle of the line 26—40 to the optical axis, 40—41, of the system is the same as the angle 36—26—35. The two gates are so related, therefore, that a line from the axial point of the virtual image of the screen, that is a line 26—40 through the optical center of one of the microscopic lenses passes through the center of the photographic image in the layer 3 as formed in the camera system of Fig. 8.

If the system of Fig. 9 is used as a camera the resultant film may be projected in a projector in which the gate has a convex curvature. Such a projector system is shown in Fig. 10, where the objective 45 has longer focal length than the objective 44 in Fig. 9. The screen is at 46, and a line 47—26 from the virtual image to the center 26 of the minute lens 2 makes the same angle with the line through 26 which is a radius of curvature of the film as the angle 40—26—42 in Fig. 9. Obviously a picture taken in a system such as Fig. 9, could be projected through a system with more convex curvature of the gate.

In every case the curvature of the gate by which I mean the reciprocal of the radius of curvature, considered as an algebraic value, is smaller in the projector than in the camera, the distance from the film to the virtual image along the axis being greater in the projector. Direction from the gate to the axis of curvature is considered as positive when measured toward the objective. Of course, if the systems were reversed they would be operative, the general rule being the same.

It is to be understood that in the several figures only enough elements are shown to explain the invention clearly, the usual structural details of camera and projector not being concerned in the invention, and that the film is shown on a much magnified scale. It is understood that in any complementary camera and projector the relative apertures are the same.

It is obvious that, particularly in the preferred forms, I have disclosed systems which are practically independent of the focal length of the objectives and by which images made in one system may be projected from a quite different system.

Having thus described my invention, what I claim as new and desire to secure by Letters Patent is:

1. An optical system for use in a color process and utilizing a photographic member comprising a support having on one surface a photographic layer and on the other numerous microscopic image-forming elements which member is capable of use in another dissimilar system having an objective, a polychromatic screen, and a gate for supporting the member, whereby the individual elements project minute images of the screen on the layer, said optical system comprising an objective, a screen similar to that of the second mentioned system and a gate having a predetermined curvature defined by the fact that, when the member is supported therein, the microscopic elements will project images of the screen on the layer at identically the same areas as in the second system.

2. An optical system for use in a color process and utilizing a photographic member comprising a support having on one surface a photographic layer and on the other numerous microscopic image-forming elements which member is capable of use in another dissimilar system having an objective, a polychromatic screen, and a gate for supporting the member, whereby the individual elements project minute images of the screen on the layer, said optical system comprising an objective, a screen similar to that of the second mentioned system and a gate having a predetermined curvature defined by the fact that in each system the angle between lines from a corresponding point in the gate to the virtual image and to the center of curvature of the gate is the same.

3. An optical system for use in a color process and utilizing a photographic member comprising a support having on one surface a photographic layer and on the other numerous, microscopic, image-forming elements which member is capable of use in another system having an objective, a polychromatic screen, and a gate for supporting the members, whereby the individual elements project minute images of the screen on the layer, said optical system comprising an objective, a screen similar to that of the second mentioned system and a gate, the virtual image of the screen being at a different distance from the gate than the virtual image of the screen in the second system is from the corresponding gate, and the gate in the said optical system being curved, the extent of curvature being predetermined and differing from that of the second system by an amount sufficient to cause the several microscopic elements to project the images of the screen on the photographic layer at identically the same areas as in the second system.

4. An optical system for use in a color process and utilizing a photographic member comprising a support having on one surface a photographic layer and on the other numerous, microscopic, image-forming elements which member is capable of use in another system having an objective, a polychromatic screen, and a gate for supporting the members, whereby the individual elements project minute images of the screen on the layer, said optical system comprising an objective, a screen similar to that of the second mentioned system and a gate, the virtual image of the screen being at a different distance from the gate than the virtual image of the screen in the second system is from the corresponding gate, and the gate in the said optical system being curved, the extent of curvature being predetermined and differing from that of the second system, and being defined by the fact that in each system the angle between lines from a corresponding point in the gate to the virtual image and to the center of curvature of the gate is the same.

5. In an optical system for use in a color process utilizing an image layer having associated therewith numerous, microscopic, image-forming elements, an objective, a polychromatic color screen associated with said objective and an exposure gate for supporting a suitable image layer, the gate being curved and concave to the objective and having its radius of curvature at least as great as the distance from its axial point to the virtual image of the screen.

6. In an optical system for use in a color process utilizing an image layer having associated therewith numerous, microscopic, image-forming elements, an objective, a polychromatic color screen associated with said objective, and an exposure gate for supporting a suitable image layer, the gate being curved and concave to the objective and having its centre of curvature on the axis of the objective at the position of the virtual image of the screen.

7. In combination, an objective, a screen associated with said objective and having parallel, differently colored bands, an image layer, and numerous, microscopic, lineal, image-forming elements associated with said layer and parallel to the bands, the image layer being bowed concave to the objective and having a radius of curvature at least as great as its distance from the virtual image of the screen.

8. In combination, an objective, a screen associated with said objective and having parallel differently colored bands, an image layer, and numerous, microscopic lineal, image-forming elements associated with said layer and parallel to the bands, the image layer being bowed concave to the objective and its axis of curvature being a line parallel to the bands and intersecting the optical axis of the objective at the virtual image of the screen.

9. In an optical system for use in a color process utilizing an image layer having associated therewith numerous, microscopic, lineal, parallel, image-forming elements, an objective, a screen associated with said objective and comprising a plurality of differently colored, parallel bands, an exposure gate for supporting a suitable image layer, the gate being cylindrically bowed and concave to the objective and its axis of curvature being parallel to the bands.

10. In an optical system for use in a color process utilizing an image layer having associated therewith numerous, microscopic, lineal, parallel, image-forming elements, an objective, a screen associated with said objective and comprising a plurality of differently colored, parallel bands, an exposure gate for supporting a suitable image layer, the gate being cylindrically bowed and concave to the objective and its radius of curvature being at least as great as its distance from the virtual image of the screen.

11. In an optical system for use in a color process utilizing an image layer having associated therewith numerous, microscopic, lineal, parallel, image-forming elements, an objective, a screen associated with said objective and comprising a plurality of differently colored, parallel bands, an exposure gate for supporting a siutable image layer, the gate being cylindrically bowed and concave to the objective and its axis of curvature being a line parallel to the bands and intersecting the optical axis of the objective at the virtual image of the screen.

12. Two dissimilar complementary optical systems for use respectively in the taking and projecting of color pictures by the use of the same photographic layer having associated therewith numerous microscopic image-forming elements and comprising two objectives with similar polychromatic screens associated therewith, there being in each system a gate for supporting the layer, the gates being curved with respect to the corresponding objective and the curvatures of the two gates having a predetermined relation defined by the fact that the screens in the two systems are imaged by the individual microscopic elements at identically the same areas in the layer supported in the curved gates.

13. Two dissimilar complementary optical systems for use respectively in the taking and projecting of color pictures by the use of the same photographic layer having associated therewith numerous microscopic image-forming elements and comprising two objectives with similar polychromatic screens associated therewith, there being in each system a gate for supporting the layer, the gates being curved with respect to the corresponding objectives and the curvatures of the two gates having a predetermined relation defined by the fact that in each system the angle between lines from a corresponding point in the gate to the virtual image and to the center of curvature of the gate is the same.

14. Two dissimilar complementary optical systems for use respectively in the taking and projecting of color pictures by the use of the same photographic member comprising a support having on one surface a photographic layer and on the other numerous microscopic image-forming elements, each system comprising an objective, a screen and a gate for the support of the photographic member, the screens being similar, and the gates being concave with respect to the corresponding objective and curvatures of the two gates having a predetermined relation defined by the fact that the screens in the two systems are imaged by the individual microscopic elements at identically the same areas in the layer when supported in the curved gates.

15. Two dissimilar complementary optical systems for use respectively in the taking and projecting of color pictures by the use of the same photographic member comprising a support having on one surface a photographic layer and on the other numerous microscopic image-forming elements, each system comprising an objective, a screen and a gate for the support of the photographic member, the screens being similar, and the gates being concave with respect to the corresponding objective and curvatures of the two gates having a predetermined relation defined by the fact that the screens in the two systems are imaged by the individual microscopic elements at identically the same areas in the layer when supported in the curved gates, in each system the angle between lines from a corresponding point in the gate to the virtual image and to the center of curvature of the gate is the same.

16. Two dissimilar complementary optical systems for use respectively in the taking and projecting of color pictures by the use of the same photographic layer having associated therewith numerous microscopic image-forming elements, each system comprising an objective, a screen and a gate for the support of the photographic layer, the screens being similar, and the gates being concave toward the corresponding objectives and each gate having its center of curvature at the virtual image of the screen in the corresponding system.

Signed at Rochester, New York this 17th day of August, 1927.

MERRILL W. SEYMOUR.